June 26, 1923.
J. M. WILKINS
FLUID PRESSURE REGULATOR
Filed Oct. 8, 1921
1,460,301
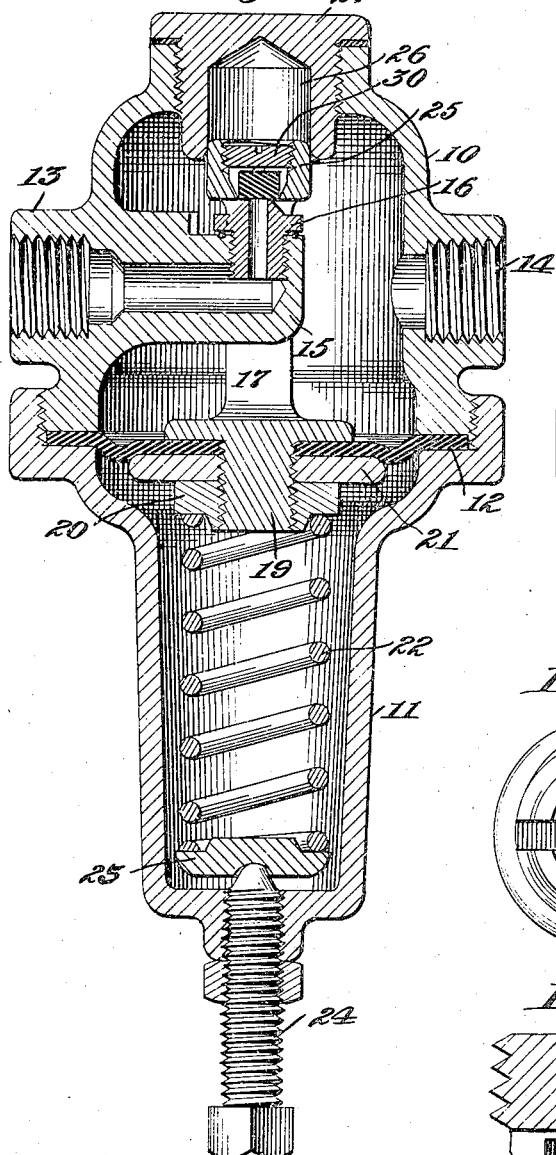
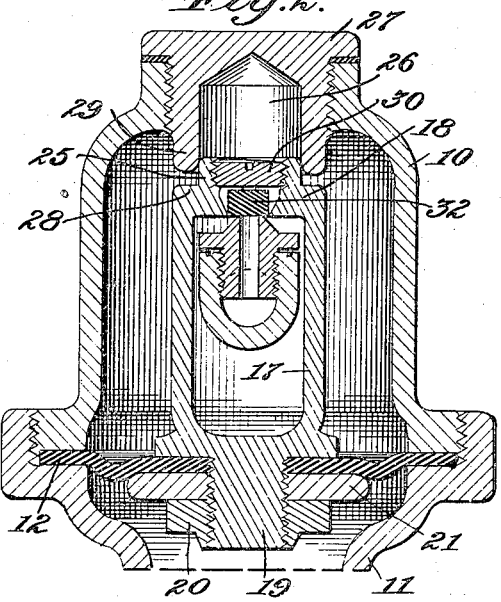
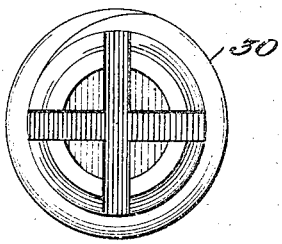
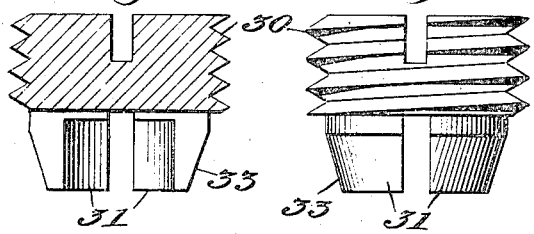
Inventor:
James M. Wilkins,
By Cushman, Bryant & Warby
Att'ys.

Patented June 26, 1923.

1,460,301

UNITED STATES PATENT OFFICE.

JAMES M. WILKINS, OF DECATUR, ILLINOIS, ASSIGNOR TO ADOLPH MUELLER, TRUSTEE, OF DECATUR, ILLINOIS.

FLUID-PRESSURE REGULATOR.

Application filed October 8, 1921. Serial No. 506,417.

*To all whom it may concern:*

Be it known that I, JAMES M. WILKINS, a citizen of the United States, residing at Decatur, in the county of Macon and State of Illinois, have invented new and useful Improvements in Fluid-Pressure Regulators, of which the following is a specification.

The present development relates to fluid pressure regulators and is intended to give an accurate and sensitive control of fluid pressures passing from the inlet to the outlet side of the regulator.

The regulator is of the diaphragm and spring type in which diaphragm and spring pressures control the inlet valve and regulate the flow.

It has for its object to provide a regulator in which the inlet valve, which is not infrequently of small area, will be effectively held in place, at the same time preserving the full seating area of the valve, so that danger of loosening of the valve and derangement of the regulator is avoided; which will permit the ready removal and repair or replacement of the valve without the necessity of taking down the regulator or removing it from the line, and which will allow for the ready adjustment of the valve to compensate for wear. A further object is to provide a construction in which the movements of the valve to and from the inlet port will be guided and held to a right line so as to insure accurate seating of the valve, and provision is made for limiting the opening movement of the valve so as to relieve the diaphragm from any undue or excessive strains.

In the present disclosure there is shown one embodiment of my invention applied to a type of regulator which, in its general features, is now in use, but it will be understood that these developments are applicable to regulators of other types, and that the present showing is merely illustrative and not restrictive of the invention.

In order that the invention may be clear to those skilled in the art, there is shown in the accompanying drawings a regulator having my improvements applied thereto.

In said drawings:—

Figure 1 is a central vertical section of a regulator showing my improvements.

Figure 2 is a central vertical section of the upper part of the regulator shown in Figure 1 on a line substantially at right angles to the plane of the section in Figure 1.

Figure 3 is a bottom plan view, enlarged, of the valve member or seat washer carrier.

Figure 4 is a sectional view of the carrier shown in Figure 3.

Figure 5 is a view in side elevation of the carrier.

Referring to the drawings by numbers, like numbers indicating like parts in the several views, 10 indicates the valve casing, and 11 the spring casing of a regulator, these casings being joined in any suitable manner, as by being screw threaded together, and between the casings will be clamped, so as to provide a fluid proof joint, the diaphragm 12. The valve casing 10 will be provided with an inlet 13 and an outlet 14, and projecting inwardly from the inlet 13 will be the inlet nipple 15, preferably formed integral with the casing, as shown, and having a valve 16 screw threaded into the nipple 15 and suitably packed to provide a fluid-tight joint. The valve seat 16 will preferably have the centrally disposed cone or projection through which the fluid passes.

Mounted upon the diaphragm 12 is the valve actuating yoke 17, here shown as having two arms which embrace the nipple 15, and provided with the cross-head 18 joining their upper ends. The yoke 17 is provided at its lower end with an abutment to engage the upper surface of the diaphragm 12 and has a threaded shank 19 passing through the diaphragm and having threaded thereon the clamping nut 20, which bears against the beveled edge washer 21, so as to clamp the diaphragm tightly between the abutment at the lower end of the yoke 17 and the washer and form a fluid-tight joint. Below the diaphragm in the spring chamber 11 is the spring 22, stressed between the nut 20 and a button 23, which button 23 is adjustably held by a screw 24 in the lower end of the spring chamber 11. The spring 22, as usual, normally urges the diaphragm upward with its yoke and the valve parts, which will now be described.

The cross-head 18 is provided with a centrally disposed projection 25 which enters, and is guided by, a recess 26 in a cap 27 threaded into the top of the valve casing 10. The projection 25 has a sliding fit in the recess 26 so that the movements of the yoke 17 will be guided and kept always in a right line as the yoke rises and falls under the opposing pressures of the spring and diaphragm. In order that the thrust of the spring 22 may be checked so that the diaphragm 12 will not be subjected to the full force of the spring upon each movement of the parts and the excessive strains and stretching which quickly reduces its effectiveness, there are provided the shoulders 28 on the yoke which will engage, after normal opening movement of the valve parts, the downwardly projecting edge 29 of the cap 27. There is, of course, sufficient movement to give a full opening of the valve, but no extended and excessive upward thrust against the diaphragm can occur.

The central projection 25 and the cross-head 18 have a passage therethrough which is screw-threaded at its upper end and is coned or tapered at its lower end. Mounted in this passage is the seat washer carrier 30, the upper end of which is threaded to engage the threaded upper end of the passage through the projection 25 and the cross-head 18, the carrier 30 being suitably nicked, or otherwise formed, for the reception of a tool for seating, removing or adjusting, and at its lower end the said carrier 30 is provided with a plurality of gripping fingers 31 which are socketed for the reception of the seat washer 32. The fingers 31 are coned or tapered at 33 to engage the tapered lower end of the passage in the head of the yoke, so that when the carrier 30 is in position, as shown in Figures 1 and 2, with the seat washer 32 in place, the members 31 will be constricted about and grip the seat washer tightly so that its displacement is impossible.

It will be seen that the seat washer 32 is gripped and held in place at its edge, with its seat face, which engages the seat 16, unobstructed over its entire area, so that there is no interference with the seating action of the valve. By adjusting the carrier 30, the seat washer 32 may be very finely adjusted to compensate for wear, and when it is necessary to replace or repair the seat washer 32, that may be readily accomplished by simply removing the cap 27 and, without disturbing the rest of the assembly, remove the carrier 30 and its seat washer, which washer 32 is usually made of a ductile metal or composition so as to give a tight seating upon the valve seat 16.

With the construction disclosed, a very efficient regulator is provided in which are seating surfaces devoid of all sediment, collecting or fluid choking cavities; in which derangement of the parts and consequent failure to act of the regulator is avoided; in which excessive diaphragm strains are done away with; and in which repairs and replacements may be quickly and conveniently made, without the necessity of disassembling or taking down the regulator.

Such departures from the disclosure here made as are within the skill of the mechanic or obvious equivalents of the construction may be made and still be within the range of my invention.

I claim:

1. In a regulator, the combination of a casing, a nipple having a valve seat in said casing, a valve supporting member having a passage with a tapered wall, a seat washer carrier having compressible fingers engaging said tapered wall adjustably mounted in said passage, a seat washer in said compressible fingers, and means for actuating said valve.

2. In a regulator, the combination of a casing, a nipple having a valve seat in said casing, a valve supporting member having a threaded passage therein with a tapered surface at its lower end, a threaded seat washer carrier having compressible fingers to engage said tapered surface adjustably threaded in said passage, a seat washer in said fingers, and means for actuating said valve.

3. A seat washer carrier for devices of the class described, comprising a threaded body portion having compressible fingers at its lower end and a seat washer in said fingers.

4. A seat washer carrier for devices of the class described, comprising a threaded body portion and a recessed lower end slitted to form washing engaging fingers, and a seat washer in said recess.

5. A seat washer carrier for devices of the class described, comprising a threaded body portion and a recessed conical lower end slitted to form washer engaging fingers, and a seat washer in said recess.

6. A seat washer carrier for devices of the class described, comprising a body portion and a recessed lower end slitted to form washer engaging fingers and a seat washer in said recess.

In testimony whereof I have hereunto set my hand.

JAMES M. WILKINS.